April 1, 1952  C. A. LINDBERG  2,590,877

ELECTRIC FAN

Filed Aug. 4, 1947

Fig 1
Fig 2
Fig 3
Fig 4
Fig 5
Fig 6

Inventor
Carl A. Lindberg

By
Attorney

Patented Apr. 1, 1952

2,590,877

UNITED STATES PATENT OFFICE 2,590,877

ELECTRIC FAN

Carl A. Lindberg, Toledo, Ohio

Application August 4, 1947, Serial No. 765,939

3 Claims. (Cl. 230—259)

This invention relates to advantageous features in manufacturing and range of acceptable operation for electric fans.

This invention has utility when incorporated in alternating current induction motor portable electric fans, as for household and office uses. More particularly there is a clamp mounting strap for the motor stator, with an adjustable angle sound deadening support connection therefor. The cooperative sound deadening features extend to a ventilating fan for the motor windings, which ventilating fan is in a dome central region from which the main fan blades radiate. A dome or cup shaped housing for the motor on the motor mounting strap has its open end with slight clearance as to the rotatable dome in which the ventilating fan is located. Ventilation clearway thru the motor is achieved by fewness of parts or brackets providing the bearings for the rotor from the stator, which mounting extends to include a guard for the main fan.

Referring to the drawings:

Fig. 1 is a front view, with parts broken away, of an embodiment of the invention, say in a 10" diameter electric fan;

Fig. 2 is a side elevation, looking from the right at Fig. 1, with portions removed;

Fig. 3 is a section on the line III—III, Fig. 2, showing the sound deadening mounting adjustable bracket and the motor shaft bracket connection to the stator;

Fig. 4 is a partial view on the line IV—IV, Fig. 2, showing in plan part of the bracket from the stator to the rotor at the shaft end remote from the fans;

Fig. 5 is a fragmentary detail of a modification showing the stator of a two-pole motor, as distinguished from the four-pole showing in Fig. 3; and Fig. 6 is a detail view in plan on the line VI—VI, Fig. 5, of the bearing bracket for the two-pole motor rotor.

The motor mounting

Adhesively attached felt pads 1 may be under a base 2 from which rises an arm 3 in which a horizontal opening eye 4 is provided. Snugly in the eye 4 (Fig. 3) and projecting therefrom is a rubber or plastic tube 5. Upon its protruding end portions compressible rubber or plastic washers 6 space parallel strap ends 7. Openings 8 in the strap ends 7 have a bolt 9 connection thru the tube or sleeve 5. The operation of a wing nut 10 on the bolt 9 may act upon the compressible means 5, 6, to develop sufficient frictional holding for the set direction of extent of the ends 7 from the support to be maintained. Furthermore, with entire absence of metal against metal at this adjustable angle mounting, there is no transmission of noise therethru to or from the fan.

A strap loop 11 forms a clamp connection between the ends 7. This clamp is adjusted by bolts 12, 13, at the parallel end portions 7, for effecting binding assembly of this clamp as embracing means about a field core or laminated stator 14 of the motor.

The motor assembly

Bolts 15 extend thru the stator 14 to mount a bracket 16 at the rear and a bracket 17 at the front end of the motor. At a centrally outwardly offset portion 18 in the bracket 17 there are complementary-seat-providing holding means for a self-aligning bearing 19 thru which extends a motor shaft 20 (Fig. 3) carrying a rotor 21. Therebeyond, the shaft 20 passes thru a second similar self-aligning or spherical bearing 22 (Fig. 4).

The stator 14 has four poles 23, 24, 25, 26, and a pair of coils 27, 28. A line connection 29 places these coils in series, with electric current supply connections or leads 30, 31, therefrom.

The stationary housing

A bullet shaped housing or shell 32 has an open end 33 adapted to slide over the clamp strap loop 11. The open end 33 has a notch 34 to clear the arms or strap ends 7, and additional notches 35 to clear mounting of a guard for the main fan. Press pins 36 thru the housing 32 at clearance regions 37 in the stator, anchor the shell 32 with the motor.

Motor ventilation

Thru the respective poles of the stator and spaced radially outward from the inner ends thereof, are pins 38 which hold the field windings 27, 28, from sagging inward too close to the rotor 21. Besides this clearance and the clearances 37, thru the stator 14 there are clearance regions 39 outward from insulation or fiber sheet portions 40 which hold the end portions of the winding coils radially outward. In the provision to have the small motors more efficient and readily self-starting, shading coils 41 have magnetic wedges 42 to bridge between the inner faces of adjacent poles.

The housing shell 32 has lateral ports 43 (Fig. 2). The motor shaft 20 in its extent beyond the bearing 19, has fixed therewith by a set screw 44 a hub 45. Fiber or sound insulation washers 46 at a shoulder 47 on the hub 45, have therebetween a disk hub 48 from which a set of four vanes or somewhat concaved wings 49 of a ventilating or minor fan extend. These fan wings 49 are so pitched relatively to the open end 33 of the housing 32 as to draw air in thru the housing ports 43, and about the rotor and coils. Notwithstanding this positive ventilation, motor noises therefrom are effectively suppressed, thru the sound deadening mounting of the minor core or ventilating fan 48, 49, at the washers 46. Such motor hum or vibrations as might be developed toward or from this minor fan source, have resonance therefrom effectively quenched by the adjustable mounting 5, 6.

The main fan

Press fitted on an extension 50 from the hub 45 as from the shoulder 47, and to pack the washers 46 and the disk 48 snugly against the shoulder 47, is a dome 51 providing housing for the ventilating fan 48, 49. The dome 51 provides symmetrical housing continuation from a ventilation fan spill gap 52 about the housing 32, open end 33. A press button 53 axially of the shaft 26, may have its stem supplement the anchoring of the dome 51 with the hub 45. From inner larger diameter open end 54 of the dome 51, there is shown a radial series of four pitched fan blades 55.

The fan guard

The bolts 15 serve not only to assemble the rotor carrying bearing brackets 16, 17, but protrude forwardly beyond the bracket 17. Besides rivets 56 to assemble the desired number of laminations in the stator 14, nuts 57 on the bolts 15 provide additional clamping means in the stator assembly. However, beyond the nuts 57, the bolts 15 pass thru U-loops 58 of diverging support arms 59, at the notches 35, outwardly anchored across guard rings 60, 61. The loops 58 and the bolt openings thru the stator and the brackets are aligned seats for the bolts 15. Nuts 62 at the bolts 15 lock the loops 58 against the nuts 57 and establish rigid assembly for the fan guard. Supplementally to the support arms 59, the fan guard is herein shown to comprise parallel wires 63 in a vertical direction with medial reinforcement by horizontally extending wires 64 having diamond spread region 65. The respective wires have bow regions 66 (Fig. 2) spacing the parallel rings 60, 61, effectively distributing the reinforcement and guard values peripherally as well as for the blade front region, and this without detracting from maximum air volume to be delivered by the fan.

Hum or other noises which may arise from the air currents thru the guard, as well as sounds from the motor, which seemingly might be objectionably transmitted thru the bolts 15 effecting the unitary mounting thereof, have not been found to perform objectionably even as to major or minor fan noises of the main fan and the ventilating fan. This quietness is attributed not only to the washers 46, but to the mounting 5, 6. On 115 volt 60 cycle current a 10" fan running at approximately 68 watts with room termperature 31° C. and while operating continuously in delivering 750 cu. ft. of air per minute, the temperature rise at the motor has been under 37° C.

According to service conditions to be met, there may be ready modification in the motor, as by increasing or decreasing the number of laminations in the stator 14, with avoidance of cost increase. A two-pole stator 67 (Fig. 5) may have in the bracket offset 18 a bracket 68 mounting metal oil impregnated disk 69 (Fig. 6) about a bearing bushing 70 for a motor shaft 71. A convenient-to-grasp push button switch 72 projects from the sheet 32 and controls current supply from wires 73, 74, to the leads 30, 31.

What is claimed and is desired to secure by Letters Patent is:

1. An electric fan comprising a motor having a stator and a rotor, bracket means from the stator providing bearings mounting the rotor, a clamp strap embracing the stator and having integral therewith parallel radiating arms, a base having an eye extending between the arms, a clamping bolt thru the arms and eye, and sound deadening spacing means between the arms and eye isolating the bolt from direct contact with the eye.

2. An electric motor stator, a stator-embracing strap having ends thereof forming arms in parallel radiating from the stator, said arms having openings therethru in alignment, a bolt, a support having an eye between the arms, said eye having a larger diameter than said bolt, said bolt extending thru the openings and eye, and sound deadening means spacing the bolt and arms from the eye.

3. An electric fan having a stator, a rotor, bearing brackets on opposite sides of the stator for mounting the rotor, a fan fixed with the rotor, assembly bolts thru one bearing bracket, the stator and the other bearing bracket and extending therebeyond toward and with clearance relatively to the fan, a fan guard, and nuts on the bolts mounting the guard in said clearance.

CARL A. LINDBERG.

REFERENCES CITED

The following references are of record in the file of this patent:

UNITED STATES PATENTS

| Number | Name | Date |
|---|---|---|
| 1,383,616 | Gilbert | July 5, 1921 |
| 2,056,547 | Weber | Oct. 6, 1936 |
| 2,129,933 | Hueglin | Sept. 13, 1938 |
| 2,157,191 | Sinnett | May 9, 1939 |
| 2,166,987 | Fitzgerald | July 25, 1939 |
| 2,212,555 | Stevens | Aug. 27, 1940 |
| 2,258,325 | Hess et al. | Oct. 7, 1941 |
| 2,303,553 | Humphreys | Dec. 1, 1942 |